US012798275B2

(12) United States Patent
Kusin et al.

(10) Patent No.: US 12,798,275 B2
(45) Date of Patent: Nov. 17, 2026

(54) IMAGE CONVERSION METHOD AND DEVICE FOR INTEGRATION OF A SECURITY FEATURE INTO A DIGITAL IMAGE

(71) Applicant: Mühlbauer ID Services GmbH, Roding (DE)

(72) Inventors: Dieter Kusin, Amberg (DE); Martin Ederer, Pösing (DE); Anton Brunner, Bad Kötzting (DE); Michael Wanjek, Nittenau (DE); Johannes Stemick, Hagen (DE); Martin Dimpfl, Lam (DE)

(73) Assignee: Mühlbauer ID Services GmbH, Roding (DE)

( * ) Notice: Subject to any disclaimer, the term of this patent is extended or adjusted under 35 U.S.C. 154(b) by 247 days.

(21) Appl. No.: 18/695,266

(22) PCT Filed: Sep. 29, 2022

(86) PCT No.: PCT/EP2022/077099
§ 371 (c)(1),
(2) Date: Mar. 25, 2024

(87) PCT Pub. No.: WO2023/052493
PCT Pub. Date: Apr. 6, 2023

(65) Prior Publication Data

US 2024/0416670 A1 Dec. 19, 2024

(30) Foreign Application Priority Data

Oct. 1, 2021 (DE) ......................... 102021125559.7

(51) Int. Cl.
*B41M 5/26* (2006.01)
*G06T 5/50* (2006.01)
(Continued)

(52) U.S. Cl.
CPC ............... *B41M 5/267* (2013.01); *G06T 5/50* (2013.01); *G06T 5/80* (2024.01); *H04N 1/32101* (2013.01);
(Continued)

(58) Field of Classification Search
CPC ........... B41M 5/267; B41M 5/26; G06T 5/80; G06T 5/50; G06T 2207/30176;
(Continued)

(56) References Cited

U.S. PATENT DOCUMENTS

2007/0211913 A1 9/2007 Washio
2008/0030798 A1* 2/2008 O'Neil ................. G07D 7/2016 358/448

(Continued)

FOREIGN PATENT DOCUMENTS

WO 2006015733 A1 2/2006
WO WO-2023052525 A1 * 4/2023 ........... G07D 7/2016

OTHER PUBLICATIONS

International Searching Authority, International Preliminary Report on Patentability issued in PCT/EP2022/07799 dated Aug. 29, 2023, 19 pages.

(Continued)

*Primary Examiner* — Stephen G Sherman
(74) *Attorney, Agent, or Firm* — Wood Herron & Evans LLP

(57) ABSTRACT

An image conversion method is provided for integrating a security feature in a digital source image to generate a target image secured by the integrated security feature. The image conversion method includes carrying out transverse-wave-shaped distortion of the source image to generate an intermediate image; generating a target image, the intermediate image being scanned by rows of pixels to define, per row of pixels of the intermediate image, a sequence of successive
(Continued)

pixels according to the scanning, and each pixel of the sequence being transformed to a corresponding pixel of the target image. The arrangement of the respective pixels of each sequence is a transverse-wave-shaped wave packet in the target image; and the integrated security feature is defined by the wave packets.

20 Claims, 9 Drawing Sheets

(51) Int. Cl.

| | |
|---|---|
| ***G06T 5/80*** | (2024.01) |
| ***H04N 1/32*** | (2006.01) |
| *B42D 25/23* | (2014.01) |
| *B42D 25/24* | (2014.01) |
| *B42D 25/309* | (2014.01) |
| *G02B 26/10* | (2006.01) |

(52) U.S. Cl.
CPC .............. *B42D 25/23* (2014.10); *B42D 25/24* (2014.10); *B42D 25/309* (2014.10); *G02B 26/105* (2013.01); *G06T 2207/30176* (2013.01)

(58) Field of Classification Search
CPC ...... B42D 25/23; B42D 25/24; B42D 25/309; G02B 26/105; G02B 26/101; G02B 26/10; G07D 7/0034; G07D 7/00; G07D 7/004; G07D 7/2016; G07D 7/20; G07D 7/206; H04N 1/32144; H04N 1/32; H04N 1/32203; H04N 1/32309; H04N 1/32224; H04N 1/32101
See application file for complete search history.

(56) References Cited

U.S. PATENT DOCUMENTS

| | | | | |
|---|---|---|---|---|
| 2010/0260985 | A1 | 10/2010 | Hagemann et al. | |
| 2011/0000967 | A1 * | 1/2011 | Labrec .................. | B42D 25/23 101/483 |
| 2016/0096392 | A1 | 4/2016 | Jones et al. | |
| 2017/0124795 | A1 | 5/2017 | Cooper | |

OTHER PUBLICATIONS

International Searching Authority, International Search Report and Written Opinion issued in PCT/EP2022/07799 dated Jan. 19, 2023, 16 pages.

* cited by examiner

IMAGE CONVERSION METHOD AND DEVICE FOR INTEGRATION OF A SECURITY FEATURE INTO A DIGITAL IMAGE

CROSS-REFERENCE TO RELATED APPLICATIONS

This application is a national stage application of, and claims priority to, International Application No. PCT/EP2022/077099, filed Sep. 29, 2022, which claims priority to German Application No. DE 10 2021 125 559.7, filed Oct. 1, 2021 with the same title as listed above. The above-mentioned patent applications are incorporated herein by reference in their entireties.

TECHNICAL FIELD

The present invention relates to a security solution, in particular a digital image with integrated security feature, and an image conversion method and an image conversion device for the production thereof, in particular for integrating a security feature into a source image.

BACKGROUND

The options for equipping objects with security features to protect against forgery include, in particular, the possibility of providing the object with an image that is difficult to forge. The objects for which this option is regularly used include, in particular, personalized documents.

A large number of different types of personalized documents, in particular in the form of cards or books, are known from the prior art. For example, book-like passport documents or individual pages thereof (e.g. the so-called "passport holder page" or paper pages), ID cards and many types of personalized chip cards, such as bank cards, credit cards, ID cards, membership cards, access authorization cards, etc. or personal (usually card-shaped) labels each belong to the group of personalized documents.

"Personalization" or "personalized" means that the corresponding document contains or carries document-specific information that is typically associated with an owner of the document. In some cases, the information can identify the holder, for example by means of his name, his passport photo, an identity number or other features that are printed on the document, applied in some other way or incorporated or stored therein, in particular in the form of data. The personalization can in particular be related to a single person, or also to a specific limited group of people, for example employees of a company.

In particular, if an object surface on which personalization information is to be provided consists of a polymer material, laser inscription represents a known option for applying the personalization information to the object surface. The object surface can be selectively processed using a laser beam in such a way that a chemical transformation of the polymer material occurs at the points where the laser beam hits the object surface, which transformation is accompanied by a color change. In particular, different gray values can be generated by this. This can be used in particular to create a gray-scale image, such as a passport photo, on the object surface.

Since laser inscription systems are commercially available, criminal structures regularly manage to obtain their possession and use them to create and circulate counterfeit objects, especially personalized documents or other security documents. The possibilities for creating such forgeries include, in particular, changing a laser inscription that has already been applied to the object surface by additional laser irradiation or by covering it with a newly added foreign substance.

It would therefore be desirable to further improve the protection against forgery of images, in particular images for the personalization of objects.

SUMMARY

These improvements are achieved by providing a security solution according to the following description. Overall, a comprehensive security solution for counterfeit protection for digital images is presented below, which, in addition to various embodiments of a solution for integrating a security feature into a digital image to be protected and such a protected digital image itself, also includes a method, a device and/or a computer program, each of which can be used to verify such a protected digital image.

A first set of embodiments of the security solution relates to an image conversion method, in particular a computer-implemented image conversion method, for integration of a security feature into a digital source image in order to generate a target image secured by the integrated security feature. The image conversion method comprises:

(i) acquiring source image data which represent a digital source image to be protected by the security feature, which digital source image comprises image points (pixels) arranged in a grid, in particular a rectangular pixel matrix, made of straight parallel rows of pixels, each having at least one pixel value, for example a gray or color value, per pixel;

(ii) generating intermediate image data, which represent an intermediate image that results from the source image by applying a distortion rule, according to which, for each row of pixels of the source image, the respective pixel values of pixels of the row of pixels, in particular of all pixels of the row of pixels, are transferred within the grid along a direction which is angled to the row of pixels, in particular perpendicular to the row of pixels, to a respective other pixel of the grid which, in relation to the respective pixel, is determined or determinable by the distortion rule in such a way that the arrangement of these other pixels in the grid has a transverse waveform;

(iii) generating target image data representing the target image, wherein:

(iii-1) the intermediate image is scanned in rows of pixels in order to define for each row of pixels of the intermediate image a sequence of pixels that follow each other according to the scanning, the pixel values of which have resulted from the transfer of corresponding pixel values from the source image in accordance with the distortion rule;

(iii-2) each pixel of the sequence is transformed into a respective corresponding pixel of the target image by determining its position in the target image based on its position in the intermediate image by compensating for the distortion suffered by applying the distortion rule when generating the intermediate image, so that the arrangement of the respective pixels of each sequence in the target image represents a transverse-wave-shaped wave packet; and (iii-3) the integrated security feature is defined by the wave packets, in particular by their shape, size and/or arrangement within the target image.

The term "acquiring" of the source image data, as used herein, can in particular be understood to mean sensory generation of the source image, for example using at least one image sensor (camera), or receiving or reading out of already existing source image data from a memory.

The term "row of pixels" as used herein can be understood to mean, in particular, a row or column of a rectangular two-dimensional pixel matrix forming the grid.

The term "transverse wave" as used herein means a waveform in which the oscillation of the wave occurs perpendicular to its direction of propagation. The term "transverse-wave-shaped" is to be understood, in a corresponding manner, as meaning a waveform of such a transverse wave. The term is to be distinguished from a longitudinal wave or longitudinal waveform in which the oscillation occurs along the direction of propagation.

The terms "scanning", "scanned" (and variations thereof) used herein in relation to an image or a row of pixels thereof are understood to mean any type of acquisition of image values of an image, in particular of the intermediate image. This includes, in particular, measuring, reading out or receiving data that represent the image values. In particular, the scanning can be carried out serially along a scanning direction, so that the respective pixel values of the pixels to be scanned which are reached one after the other along the scanning direction, that is to say, in the case of scanning a row of pixels, the pixel values of the pixels of the row of pixels to be scanned which are reached one after the other, are acquired one after the other.

As possibly used herein, the terms "encompasses", "contains", "includes", "comprises", "has", "with", or any other variant thereof are intended to cover non-exclusive inclusion. For example, a method or a device that comprises or has a list of elements is not necessarily restricted to these elements, but may include other elements that are not expressly listed or that are inherent to such a method or such a device.

Furthermore, unless expressly stated to the contrary, "or" refers to an inclusive or and not to an exclusive "or". For example, a condition A or B is met by any one of the following conditions: A is true (or present) and B is false (or not present), A is false (or not present) and B is true (or present), and both A and B are true (or present).

The terms "a" or "an" as used herein are defined in the sense of "one or more". The terms "another" and "a further" and any other variant thereof are to be understood to mean "at least one other".

The term "plurality" as used herein is to be understood to mean "two or more".

As possibly used herein, the term "configured" or "set up" to perform a specific function (and respective modifications thereof) is to be understood, in the sense of the invention, that the corresponding device is already provided in a form or configuration in which it can execute the function or in which it is at least settable—i.e., configurable-so that it can execute the function after having been set in a corresponding manner. The configuration can take place, for example, via a corresponding setting of parameters of a process or of switches or the like for activating or deactivating functionalities or settings. In particular, the device can have multiple predetermined configurations or operating modes, so that the configuration can be carried out by selecting one of these configurations or operating modes.

The image conversion method according to the first set of embodiments is thus able to convert a raster graphic representing the source image into a graphic represented by the target image or the target image data, in which the pixels are arranged in a plurality of parallel transverse wave packets. Such a graphic is much more difficult to create than a conventional raster graphic. Further, in particular, personalization systems, in particular laser inscription systems, which could produce such a target image that does not correspond to a raster graphic in sufficiently high image quality are not readily available to counterfeiters. The image conversion process can therefore increase the security of a source image against forgery by integrating the security feature defined by the transverse wave packets.

Various embodiments of the image conversion method are described hereinafter, by way of example, each of which, unless expressly excluded or technically impossible, can be combined as desired with one another and with the other embodiments of the present security solution, which will be described in the following.

The source image represented by the source image data can in particular represent a photograph of a person or one or more of their body regions, in particular the face or a portion thereof. The source image can in particular represent a portion of a larger image.

In particular, the distortion rule can be the same for all image series to which it is applied.

In some embodiments, the image conversion method further comprises generating a physical reproduced image of the target image on a surface of a substrate, wherein the reproduced image of the target image is generated by serially generating pixels on the substrate by, in order to generate a series of pixels on the substrate, which corresponds to a respective sequence of pixels of the target image, generating these pixels of the series on the substrate in accordance with the pixel order defined by the sequence of the corresponding pixels of the target image. The substrate can in particular be a document page of a document, such as a personalized document or document to be personalized, such as an identification document. Thus, in addition to image conversion, the method can also be used to generate a physical reproduced image of the target image and thus in particular to provide an object with a personalization that contains the target image in whole or in part.

In some of these embodiments, the physical reproduced image of the target image is generated on the substrate using laser inscription, in which the pixels of the reproduced image are sequentially generated on the substrate using a laser beam. In this way, it is possible to carry out the new personalization in accordance with the method using proven inscription technology, in particular also with high image resolution.

In some such embodiments, the different positions of the series at which the laser beam strikes the substrate to generate the pixels of the reproduced image are controlled by variable deflection of the laser beam in a mirror-based laser galvanometer. The use of such laser galvanometers can be advantageous in various ways. In particular, high precision and resolutions as well as high process speeds can be achieved despite serial pixel generation. The required installation space can also be kept small.

In addition, such laser galvanometers regularly offer the possibility of specifically compensating or correcting possible distortions in the inscription to be generated, which may be caused in particular by uneven object surfaces or imaging errors in the optics of the laser galvanometer, using correction information, in order to at least partially compensate for such distortions. The mirrors of the laser galvanometer are specifically controlled with an offset profile specified in the correction information, so that in principle every possible substrate shape can be provided with the same inscription without distortion. This possibility of many laser galvanometers can now be used-especially in the sense of "dual use"—as part of the image conversion method in particular in order to compensate for the distortions suffered by applying the distortion rule when generating the intermediate image in order to generate the target image. The correction information itself can then in particular be viewed as the target image data, since by the corrections to be used as compensation (bias) during laser inscription, they define and thus represent the target image which is to be generated as a reproduced image on the substrate by laser inscription.

In some embodiments, at least one, in particular all, mirrors of the laser galvanometer are controlled using a control signal for controlling a respective position of a pixel of the reproduced image to be generated on the substrate, which control signal is defined as a function of the compensation that has been determined for that pixel of the intermediate image which corresponds to the pixel of the reproduced image to be generated. In this way, the compensation in accordance with the method can be achieved for each pixel.

In some embodiments, a laser galvanometer is used for variable deflection of the laser beam, in which the inertia of at least one of its mirrors used for deflection is so large that, when imaging the wave packets of the target image by generating the pixels of the reproduced image on the substrate, deviations between the reproduced image and the target image arise in the event of abrupt changes in direction along the course of the wave packets. In this way, the reproduced image on the substrate only approximately corresponds to the target image, wherein the deviations of the two images occur primarily where the course of wave packets in the target image has abrupt changes in direction that are not transferred 1:1 to the reproduced image to be generated on the substrate due to the inertia of the mirrors. In particular, at such locations of wave packets in the reproduced image, small rounding typically occur compared to the corresponding course of the respective wave packet in the target image. This effect, which is very difficult for counterfeiters to reproduce, can be used to further increase the anti-counterfeit protection that can be achieved with the image conversion method and provided by the security feature.

In some embodiments, the arrangement of the respective pixels of each sequence in the target image is determined so that it represents a transverse-wave-shaped wave packet that is periodic at least in some portions. In particular, it can be sinusoidal, at least in some portions. The provision of such a periodicity is advantageous in particular with regard to a later verification of the reproduced image on the substrate if a verification method, such as that described below, is to be used, which is based on recognizing periodic structures in the reproduced image. Sinusoidal curves are advantageous in particular if, as part of the verification, a (discrete or continuous) Fourier transformation is to be used or can be used to detect such periodic structures in the reproduced image.

In some embodiments, the arrangement of the respective pixels of each sequence in the target image is determined such that each of two adjacent wave packets are separated from each other by a gap. In particular, according to some of these embodiments, it is advantageous if the substrate is selected or processed in such a way that it has a color that stands out relative to the average of the colors of the pixels that form the wave packets of the target image, which are determined according to the pixel values, in such a way that neighboring wave packets can be visually distinguished. The separating of the wave packets serves, on the one hand, to be able to distinguish them from one another, especially optically, for example with the naked eye or using image magnification optics, such as a magnifying glass or a microscope. On the other hand, this also facilitates the previously mentioned recognition of periodic structures in the reproduced image on the substrate, wherein the provision of the gaps themselves can be used to provide further periodic structures in the reproduced image, which (also) serve as a basis for later verification.

In some embodiments, each of the wave packets resulting in a respective sequence has at least two inflection points. This promotes the recognizability of the wave pattern represented by the wave packets and can also increase the reliability and/or accuracy that can be achieved during verification, in particular when recognizing periodic structures.

In some embodiments, the grid of the pixels of the source image has rows and columns, and the resolution of the rows is different from the resolution of the columns. This is particularly advantageous if—as already described above-gaps are provided between adjacent wave packets. By using a grid with different resolution, the space taken up by the gaps can be compensated, at least in part, by a correspondingly lower resolution or point density, in particular along the transverse direction of the wave packets, so that no or only a small tolerable distortion of the target image or reproduced image occurs on the substrate.

In some of these embodiments, the resolution of the source image in the direction orthogonal to the rows of pixels is at most 70% of the resolution in the direction running along the rows of pixels. Experiments have shown that this range is particularly well suited, since here, on the one hand, largely distortion-free target images or reproduced images can usually be achieved on the substrate and, on the other hand, sufficiently large gaps between adjacent wave packets can also be achieved with a view to reliable and precise verification.

In particular, in some embodiments, the resolution of the source image in the direction orthogonal to the rows of pixels is at least 200 pixels per inch or 2.54 cm (PPI). This range is in turn particularly favorable with regard to the stated goals of achieving a largely distortion-free target image or reproduced image and reliable and accurate verification.

In some embodiments, the pixels of the target image are determined in such a way that their respective extents are the same along and orthogonal to the transverse direction of the wave packets. This can in particular include cases in which the pixels of the source image have different dimensions depending on the direction, for example if they have a non-square, rectangular shape. In order to achieve the same extent of pixels of the target image in the transverse direction and orthogonally thereto according to these embodiments, the respective corresponding pixels of the source image can be "trimmed", in particular in such a way that the portion of the pixels that is eliminated by this corresponds at least approximately to the space required by the corresponding gap in the target image and thus a resulting image distortion (not to be confused with the distortion according to the distortion rule in accordance with the method) can at least largely be avoided in the course of the transition from the source image to the target image.

In some embodiments, the distortion rule is defined such that when it is applied to rows of pixels of the source image, at least for a subset of the rows of pixels, the wave packet respectively resulting from this has a first waveform in one or more portions of its course and a second waveform different from the first waveform in at least another portion of its course. In particular, this can be done in such a way that the first waveform or the second waveform is rectilinear or contains at least one rectilinear portion. This further increases the complexity of the wave pattern that defines the security feature and thus further increases the achievable counterfeit protection as well.

A second set of embodiments of the security solution relates to an image conversion device, in particular data processing device, which is configured to carry out the method steps of the image conversion method according to the first set of embodiments, in particular according to one or more of its embodiments described herein.

A third set of embodiments of the security solution relates to a computer program or computer program product, comprising instructions that cause the image conversion device according to the second set of embodiments to carry out the method steps of the image conversion method according to the first set of embodiments, in particular according to one or more of its embodiments described herein.

The computer program can in particular be stored on a non-volatile data carrier. Preferably, this is a data carrier in the form of an optical data carrier or a flash storage module. This can be advantageous if the computer program as such is to be traded independently of a processor platform on which the one or more programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of interacting individual program modules. In particular, the modules can be configured or at least usable in such a way that they are executed in the sense of distributed computing on different devices (such as computers or processor units) that are geographically remote from one another and connected to one another by a data network.

The image conversion device according to the second set of embodiments can accordingly have a program memory in which the computer program is stored. Alternatively, the image conversion device can also be set up to access a computer program available externally, for example on one or more servers or other data processing units, via a communication connection, in particular in order to exchange data therewith, which data are used during the execution of the method or computer program or represent outputs of the computer program.

A fourth set of embodiments of the security solution relates to a digital image with an integrated security feature as a target image or reproduced image thereof on a substrate, obtainable by the image conversion method according to the first set of embodiments, in particular according to one or more of its embodiments described herein.

A fifth set of embodiments of the security solution relates to a digital image with an integrated security feature, in particular according to the fourth set of embodiments, comprising a plurality of mutually parallel rows of pixels, each of which has a transverse-wave-shaped course, wherein adjacent rows of pixels are separated from one another by a gap which, as regards its color, stands out at least in some portions with respect to the rows of pixels separated thereby, wherein the security feature is defined by the wave-shaped course of the rows of pixels and of the gaps between them.

In some embodiments, the digital image according to the fourth or fifth sets of embodiment is formed on a document page serving as a substrate, in particular a data page, for a value document or a security document. In particular, the digital image can be an image, such as a passport photo, of a holder of the document, especially if this represents an identification document.

The features and advantages explained with respect to the first set of embodiments of the security solution also apply correspondingly to the further embodiments of the security solution mentioned above.

Furthermore, a verification methodology is described below in various other embodiments of the security solution, which can each be used to verify a digital image, in particular a digital image according to the fourth or fifth sets of embodiments of the security solution. The verification methodology and its individual aspects therefore represent one or more further possible elements of the security solution mentioned at the beginning to protect against counterfeiting of digital images.

A sixth set of embodiments of the security solution relates to a verification method for verifying a digital image with an integrated security feature, in particular a digital image according to the fourth or fifth sets of embodiments of the security solution. It comprises:

(i) transforming the digital image from a spatial domain defined by the spatial arrangement of its pixels into a frequency domain using a mathematical transformation which has the property of mapping distances between adjacent lines in the spatial domain into the frequency domain in such a way that different distances in the spatial domain correspond to different frequencies in the frequency domain;

(ii) comparing the spectrum resulting from the transformation with at least one reference spectrum which represents a spectrum of a digital original image which is generated or can be generated by the transformation and which is to be classified as genuine; and (iii) classifying the digital image to be verified as authentic or fake depending on the result of the comparison.

The term "transformation" and variants thereof, as used herein, can in particular be understood to mean a discrete or a continuous transformation, for example a discrete or continuous Fourier transformation.

The verification method thus opens up the possibility of checking the authenticity of a digital image to be verified in the frequency domain instead of only, or in addition to, a check in the spatial domain. Since the transformation into the frequency space is based on periodic functions, in particular sinusoidal functions, structures of the image that exhibit periodicity can be recognized particularly well when testing in the frequency domain. These include, in particular, digital images, such as digital images according to the fourth or fifth sets of embodiments of the security solution, which contain a plurality of image rows of pixels that are periodically spaced apart from one another and/or each include a periodic transverse wave course. Even if such digital images represent essentially the same image as a pure conventional raster graphic image, so that a distinction between the two images in the spatial domain is difficult or only possible reliably with special analysis means, the verification method can assist in achieving, due to the verification in the frequency domain and thus a different verification concept, such a desired distinction.

Due to the wave personalization form, the reproduced images of the frequency domain of different images produced using the same personalization method can easily be compared. In particular, it is not necessary to use a database, but it is sufficient, for example, that only the spectrum or frequency image (e.g. Fourier transform) corresponding to the original image is stored “offline” on a verification device intended to carry out the verification method in order to be able to carry out the verification.

Various embodiments of the verification method are described hereinafter, by way of example, each of which, unless expressly excluded or technically impossible, can be combined as desired with one another and with the other aspects of the verification methodology, which will be described in the following.

In some embodiments, the transformation is a two-dimensional transformation that transforms a two-dimensional spatial domain defined by the surface extent of the digital image to be verified into an associated two-dimensional frequency domain. In particular, periodicities occurring within the image that occur along different directions in the image can be easily recognized and used for verification.

In some embodiments, before the transformation is carried out, a plurality of mutually different image sectors are defined in the image to be verified, in particular in the sense of dividing (such as a tessellation) the image into image sectors that cumulatively cover the entire image. The transformation is carried out individually for several, in particular all, of the image sectors in order to obtain a spectrum in the frequency domain assigned to the respective image sector. The comparing involves a comparison on an image sector basis, in which for each of the image sectors that were subjected to the transformation, the spectrum resulting from the transformation is compared with at least one reference spectrum (of the original image) assigned to the respective image sector, which represents a spectrum generated or generatable by the transformation and which is a spectrum of the corresponding image sector of a digital original image that can be classified as genuine. The digital image to be verified is then classified as authentic or fake depending on the results of the comparisons carried out on an image sector basis.

This approach based on image sectors can be advantageous and improve the capabilities of the verification process with regard to detecting forgeries in particular if the fake image has only small or mainly small changes (falsifications) compared to the original image, which when transferring the complete image (e.g. photo of a document holder) from the spatial domain into the frequency domain only lead to a spectrum for the complete image that only differs slightly from that of the original image due to frequency overlap. On the other hand, the image sector-based generation of spectra in the frequency domain makes it easier to find deviations in the corresponding spectra of the image to be verified and the original image (reference spectrum) in image sectors affected by the forgeries, since these are typically larger than for the complete image.

In some of these embodiments, the digital image to be verified is classified as inauthentic if a number N of the comparisons carried out on an image sector basis, in which a determined deviation between the spectrum of the respective image sector and the reference spectrum assigned to it that lies beyond a predetermined deviation threshold, is greater than a predetermined verification threshold M. In particular, N=1 can be chosen. With this threshold value approach, the above-mentioned verification approach based on an image sector-based evaluation can be implemented in a particularly simple and efficient manner.

In some embodiments, the digital image to be verified represents at least a portion of a body region, in particular the face, of a person and the verification method further comprises: (i) carrying out an image analysis, in particular facial feature recognition, with respect to the digital image to detect at least one predetermined biometric feature of the person and for locating this at least one recognized biometric feature in the digital image; and (ii) selecting an image region of the digital image representing the respective biometric feature as an image sector of the plurality of mutually different image sectors. In this way, the definition of the image sectors can be optimized in such a way that image sectors are specifically defined where forgeries are particularly likely, namely in the area of structurally strong image areas, in particular those that represent biometrically relevant body regions. In this way, the performance of the verification process can be increased even further.

In some embodiments, the comparison of a spectrum obtained from the transformation with an associated reference spectrum is carried out on the basis of (a) a point-by-point comparison of a plurality of spectral values of both spectra that correspond to one another in the frequency domain, in particular of all corresponding spectral values of both spectra, and a comparison of the possible resulting deviations individually or in cumulative form with a correspondingly defined deviation threshold, or (b) a comparison function which calculates an evaluation from the measured spectrum and the reference spectrum, and a comparison of the evaluation with a correspondingly defined deviation threshold, to establish a comparison result indicating whether the comparison detected a relevant deviation. By selecting the number of spectral values used, a desired ratio between efficiency and effectiveness of the verification process can be set.

In some embodiments, the transformation corresponds to, or is based on, at least one of the following transformation types: (i) Fourier transform; (ii) cosine transform: (iii) Laplace transform: (iv) wavelet transform: (v) Gabor transform.

A seventh set of embodiments of the security solution relates to an image verification device, in particular a data processing system, which is configured to carry out the method steps of the aforementioned verification method.

An eighth set of embodiments of the security solution relates to a computer program or computer program product, having commands that cause the aforementioned image verification device to carry out the method steps of the aforementioned verification method.

The features and advantages explained in relation to the verification method according to the sixth set of embodiments of the security solution also apply accordingly to the aforementioned further embodiments of the security solution in relation to the verification methodology.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
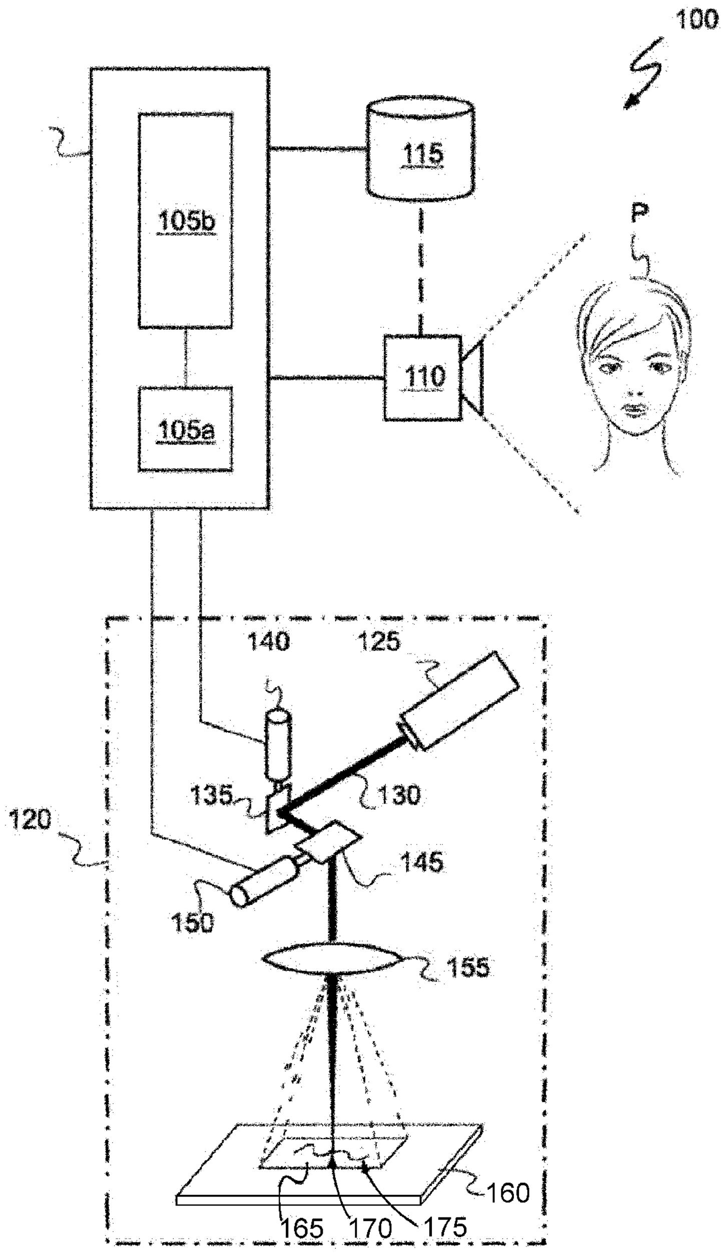
FIG. 1 schematically shows a system for image conversion according to an exemplary embodiment of the security solution with an image conversion device along with a laser galvanometer for laser inscription of substrates.

The system 100 for image conversion illustrated in FIG. 1 according to an exemplary embodiment of the security solution has an image conversion device 105, which can in particular have a data processing device with a processor 105*a* and a memory 105*b*. The memory 105*b* can in particular serve as a program memory for a computer program that contains instructions which, when executed on the processor 105*a*, cause the image conversion device 105 to carry out an image conversion method in accordance with the security solution (for example according to FIG. 2). Accordingly, the image conversion method can in particular be designed as a computer-implemented method.

The system 100 can further have an image sensor (camera) 110 for recording a digital image, in particular a two-dimensional digital image, of an object, such as a person P. Additionally or alternatively, a data memory 115 may be provided which contains image data that represent an image of such an object. In particular, it is possible for the image data to be generated by the image sensor 110 and temporarily stored in the data memory 115 in order to be able to make it available to the image conversion device 105 from there. The system 100 itself can optionally also be designed in such a way that it already contains the image sensor 110 and/or the data memory 115 as components, in particular in a structural unit. An image provided, in accordance with this, as an input to the image conversion device 105 is referred to below as a “source image” and the data representing it as “source image data”.

If the image conversion device 105 carries out an image conversion method in accordance with the security solution, in particular the image conversion method 200 according to FIG. 2, and, as a result of this, generates a converted image, which in the following is referred to as a “target image” and the data representing it as “target image data”, it is also possible to transfer this target image to a substrate 160 as a physical reproduced image 165 of the same. This can be done in particular, as shown in FIG. 1, by laser inscription. The substrate 160 can in particular be a page of a document suitable for inscription by the inscription technology used to generate the reproduced image 165, in the case of laser inscription in particular a page which comprises at least a polymer material which can be modified by laser light in order to achieve a change in properties, in particular to achieve a color change.

In the system 100, a laser galvanometer 120 is specifically provided as a device for laser inscribing substrates 160. It has a laser 125, which is configured to emit a laser beam 130, which impinges on a first mirror 135 in order there to be deflected onto a second mirror 145 depending on a position of a first mirror 135 that can be adjusted by a first mirror drive 140. The second mirror 145 in turn has a mirror drive 150 in order to be able to variably adjust the position of the second mirror 145. The laser beam 130 deflected by the second mirror 145 then passes through a focusing optics 155, which in particular can be, or comprise, an F-theta lens. From the focusing optics 155, the focused laser beam 130 then hits the substrate 160 to be inscribed in order to generate, at the point where it hits the substrate 160, a pixel 170 of the reproduced image 165 of the target image to be generated. By appropriately controlling the two mirror drives 140 and 150, it can be achieved that the laser beam 130 is variably deflected by the combination of the mirrors 135 and 145, so that its point of impact on the substrate has a linear course over time. Since the target image, as will be explained in detail below, has wave-shaped image components, these wave packets are correspondingly transferred to the substrate 160 during laser inscription in wave-shaped inscription lines in the form of wave packets 175 formed from pixels of the reproduced image 165.

Figure 2:
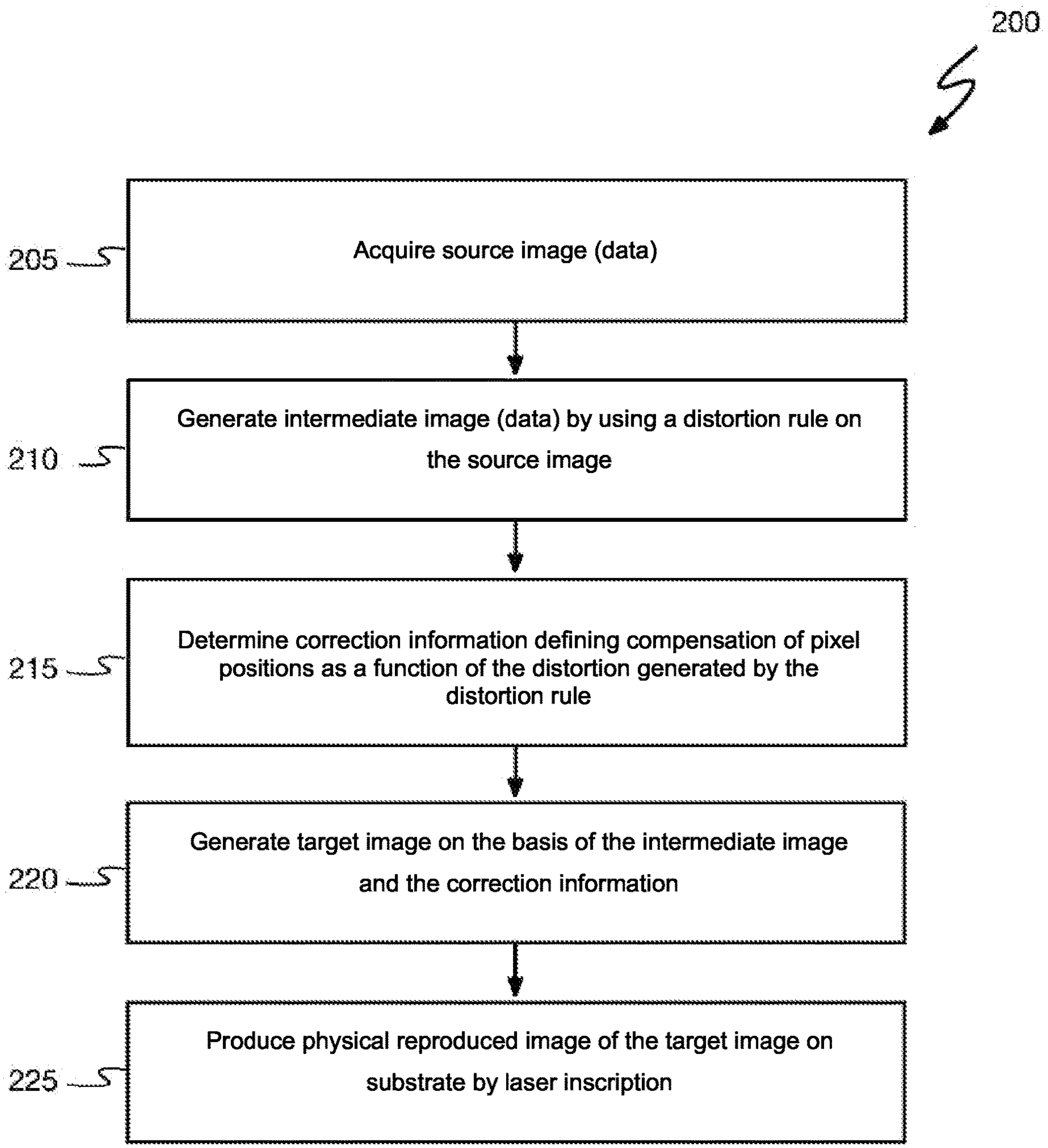
FIG. 2 is a flowchart illustrating an exemplary embodiment of the image conversion method in accordance with the security solution.

FIG. 2 illustrates an exemplary embodiment 200 of an image conversion method, which can be carried out in particular by the system 100. In the further FIGS. 3 to 7, individual steps of the image conversion method 200 are illustrated in greater detail.

Figure 3:
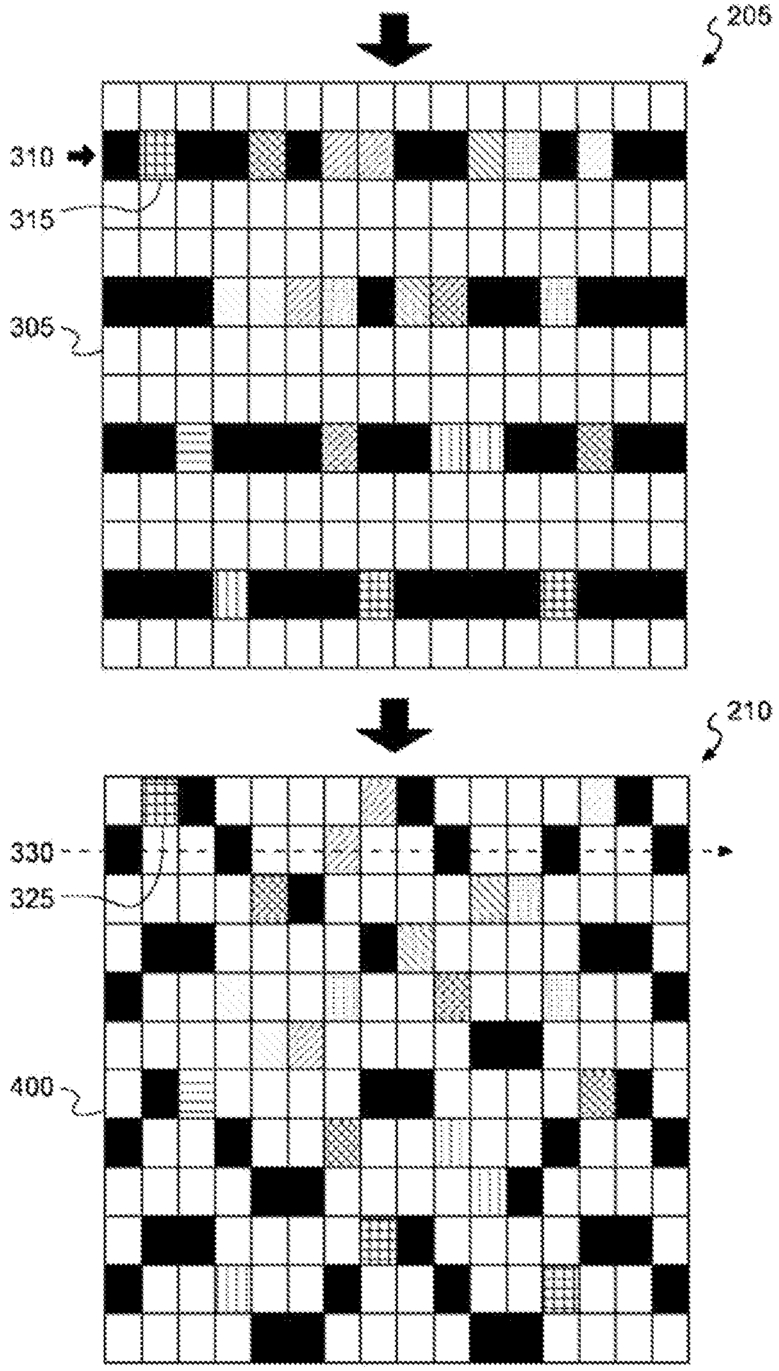
FIG. 3 shows a schematic representation to illustrate an exemplary generation of a raster graphic intermediate image from a raster graphic source image as part of the method from FIG. 2.

As part of the image conversion method 200, a source image 305 is first acquired in a step 205, as already described in more detail with reference to FIG. 1, and, in the form of source image data representing the source image 305, is provided as input for the further steps of the image conversion method 200. In the following, for the purpose of FIGS. 3 to 5, it is assumed, by way of example and in order to simplify the illustrations, that the source image 305 is a digital raster graphic of two-dimensional image points (pixels) arranged in a matrix, which represents a set of parallel straight lines which, in the source image 305, run along the row direction in the source image 305. In FIG. 3, different image values are indicated by different hatching or black or white coloring. By way of example, it is assumed here that the source image 305 and the intermediate image 400 are each a gray value image and each pixel is assigned exactly one gray value as an image value (pixel value). The resolution in the grid can, as assumed here, differ for rows and columns of the grid, so that the pixels have a rectangular, non-square shape, in which, for example, the height of the pixels 315 and 325 is greater than their width. This will be explained in more detail below with reference to FIG. 7.

In a further step 210, which is illustrated in more detail in FIG. 3, an intermediate image 400 is generated from the source image 305, which intermediate image is represented by corresponding intermediate image data. The intermediate image 400 results from the source image 305 by applying a distortion rule that defines a transverse-wave-shaped distortion in such a way that the respective image values of pixels 315 of the same row of pixels 310 (in particular row or column of the raster graphic) are shifted within the grid in such a way that the pixels 325 to which the image values of the row of pixels 310 are shifted have an arrangement within the grid that resembles a transverse wave running along a "propagation direction" 330 parallel to the rows of pixels 310. The shape of the transverse wave can in particular, at least in some portions, be sinusoidal, which can be advantageous in particular with regard to the verification method described below, which is based on a Fourier analysis.

In the image conversion method 200, a further step 215 follows, which starts from the intermediate image 400 generated in step 210. Depending on the distortion rule used in step 210 to distort the source image 305, correction information is determined which, based on the grid of the intermediate image 400, defines a shift in pixel positions of the grid and which has the effect that the target image 455 appears, or would appear, at least largely undistorted to a viewer of the target image 455. The matrix-shaped grid is thus modified in such a way that rectilinear rows of pixels 310 of the grid are each converted into transverse-wave-shaped wave packets of pixels that correspondingly follow one another in a transverse-wave-shaped course in such a way that, by this, the distortion generated in step 210 is at least largely compensated for.

Figure 4:
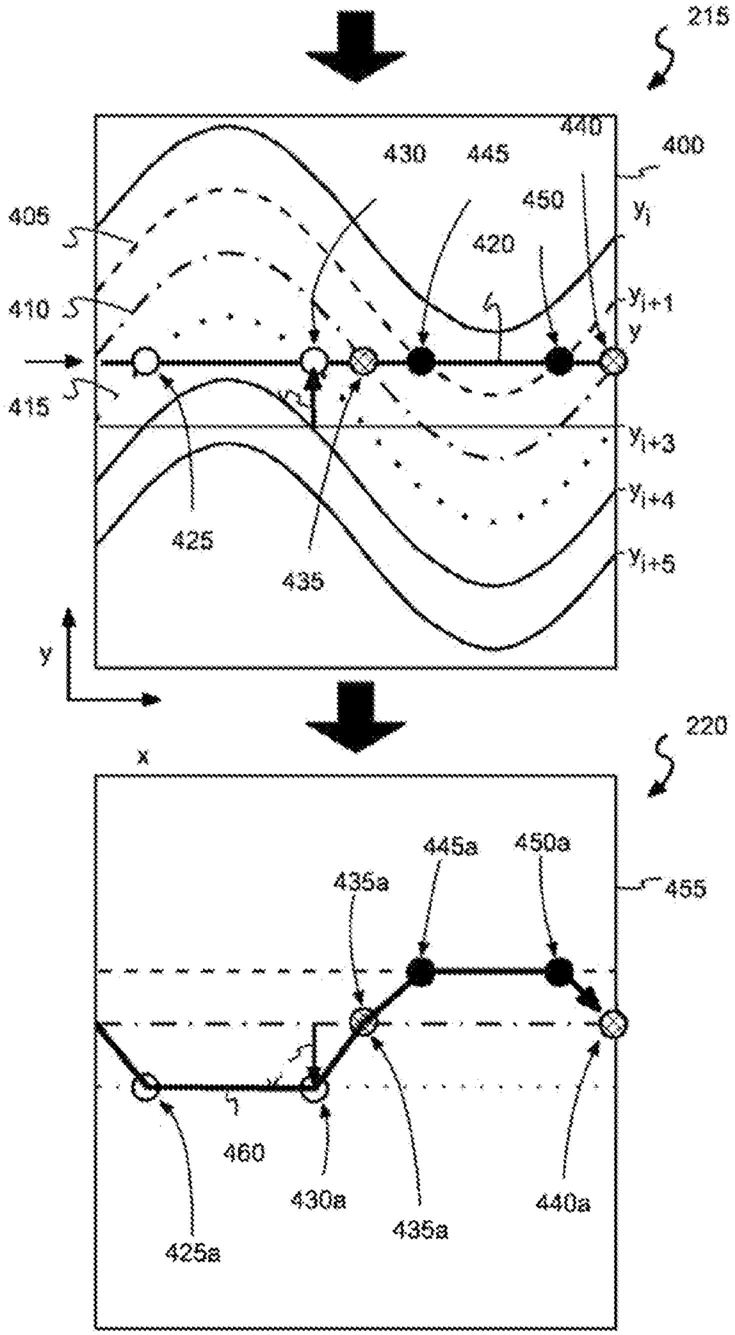
FIG. 4 shows a schematic representation to illustrate an exemplary generation of a target image from an intermediate image as part of the method from FIG. 2.

Step 215 is illustrated in an exemplary and simplified manner in FIG. 4. For this purpose, the intermediate image 400 is shown again in a simplified representation in the upper region of FIG. 4, with some exemplary transverse-wave-shaped arrangements of pixels each having resulted from the distortion in step 210, in particular the arrangements 405, 410, 415. Each of these transverse-wave-shaped arrangements has emerged in step 210 from a rectilinear row of pixels, in particular row of pixels 310 of the source image 305. Now, in order to get from the intermediate image 400 to the target image 455, the intermediate image 400 is scanned along straight-line scan paths 420, of which only one is illustrated as an example in FIG. 4 to simplify the representation. Along a scanning direction of the scan path 420, the positions of pixels 425 to 450 lying thereon are acquired, each of which belongs to one of the transverse-wave-shaped arrangements of pixels, such as the arrangements 405, 410 and 415 in this example. For pixel 430, a displacement vector v is shown as an example, which corresponds to the shift of the pixel value of a (starting) pixel in the source image 305 to the corresponding "other" pixel 430 in the intermediate image 400 having taken place as part of the distortion in step 210. This applies accordingly to the other pixels 425 and 435 to 450 individually identified here.

As part of step 220, this distortion is compensated for, using a displacement vector v' that is inverse to v. Unlike distortion, compensation does not involve transferring image values from one pixel to another, but instead shifts the positions of the pixels themselves, which, in the course of this, retain their respective pixel values. Referring to the pixel 430 of the intermediate image 400 as an example, this means that its position is shifted by the displacement vector v', as shown in the lower part of FIG. 4. If this is also done accordingly for the other pixels 425 and 435 to 450 lying on the scan path 420, wherein their individual displacement vector v' is respectively determined and used for compensation, then the result is a transverse-wave-shaped wave packet 460 in the target image 455 formed from the correspondingly shifted pixels 425*a* or 435*a* to 450*a*.

Overall, this displacement process is carried out in step 220 for all defined (parallel) scan paths 420, so that, in the target image 455, a set of transverse-wave-shaped wave packets 460 results.

Figure 5:
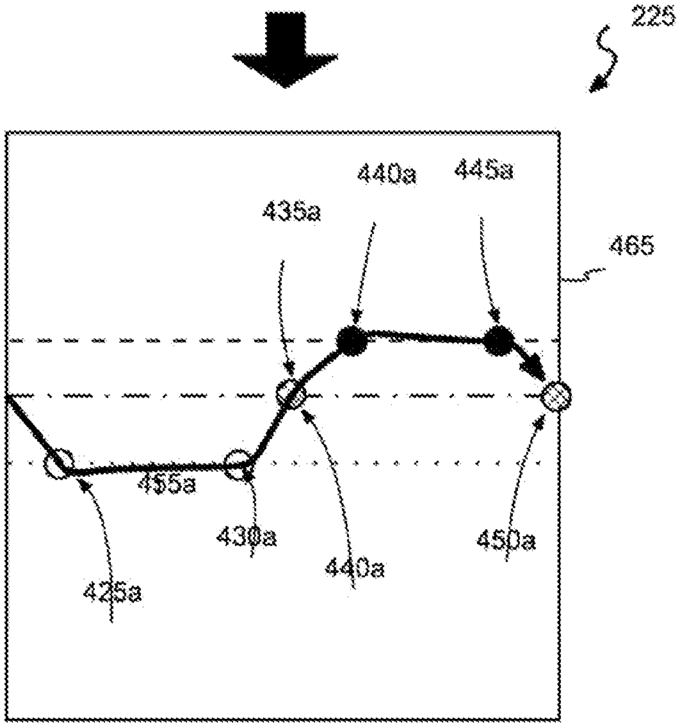
FIG. 5 shows a schematic representation to illustrate an exemplary generation of a reproduced image of the target image on a substrate by laser inscription as part of the method from FIG. 2.

In a further step 225, which is illustrated in more detail in FIG. 5, based on the target image 455, a physical reproduced image 465 of the same can be generated on the substrate 160 by laser inscription, for which the incidence point (at pixel 170) of the laser beam is guided by corresponding control of the laser inscription device, in particular of the laser galvanometer 120 of the system 100, along a respective laser path 455*a* so that the wave packets 460 of the target image 455 are imaged onto the substrate 160 by forming corresponding pixels of the reproduced image along the laser path 455*a*.

However, as illustrated in FIG. 5, in practice the transfer of the target image 455 into the reproduced image 465 is usually not perfect. This may be due in particular to the fact that the mirrors 135 and 145 have a non-zero inertia and, at high laser inscription speeds, are no longer able to accurately image abrupt changes in direction along the courses of the wave packets 460 onto the substrate 160. Therefore, at points of strong changes in direction, deviations can regularly arise between the exact shape of the respective wave packet 460 and the associated laser path 455*a* derived therefrom. In particular, "angular" portions of the course of a wave packet 460 will generally have a rounded shape in the reproduced image 465, particularly in the sense of an "overshoot". This is shown as an example in FIG. 5, wherein the pixels 425*a* to 450*a* of the target image 455 are displayed as a reference in order to make the deviations clearly visible. However, this imperfect mapping from the target image 455 into the reproduced image 465 is actually advantageous because it represents a further aspect of the security feature defined by the wave packets of the reproduced image 465, which makes forgery even more difficult.

Figure 6:
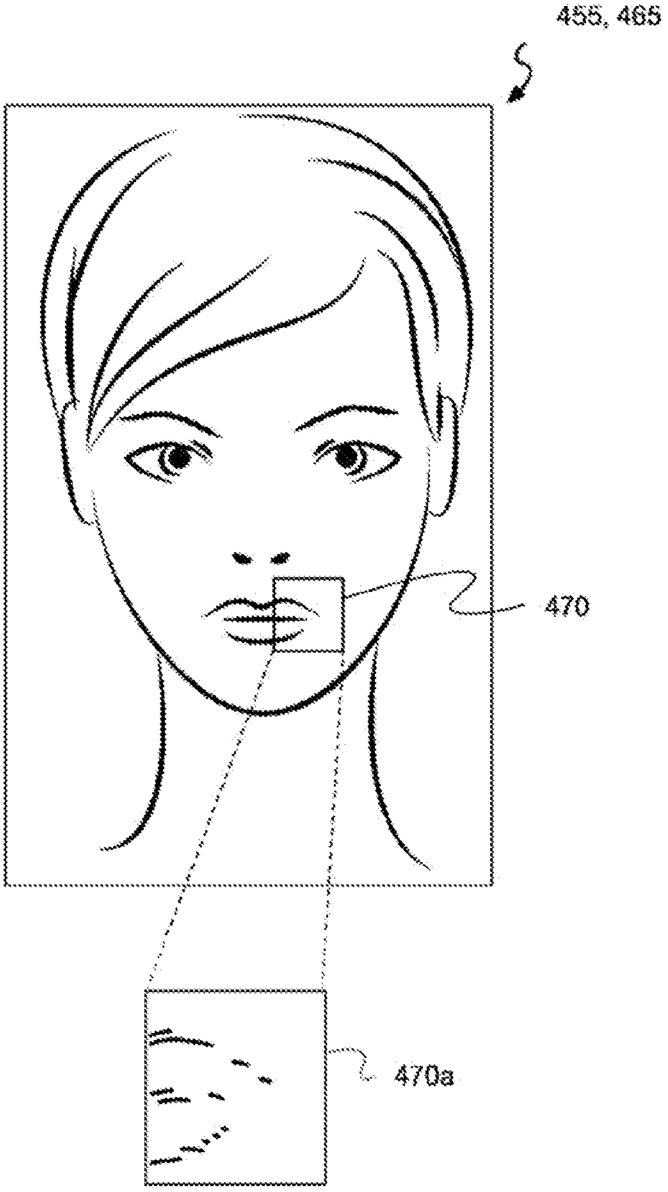
FIG. 6 shows a schematic representation to illustrate a wave structure that can be generated in the target image as part of the method from FIG. 2 and, if applicable, the reproduced image of the target image generated therefrom on a substrate.

FIG. 6 illustrates, using an enlarged representation 470*a* of an exemplary image portion 470, a wave structure that can be generated within the framework of the method 200 in the target image 455 or the reproduced image 465 generated therefrom on a substrate 160 (without showing the deviations mentioned between target image 455 and reproduced image 465). The notable mouth portion contained here in the image portion 470 is represented in the target image 455 or equally in the reproduced image 465 by corresponding gray values of the pixels (here forming the thick line regions of the wave packet portions) on the wave packets, which contrast with neighboring image regions. The adjacent wave packets are separated from one another by a space of a different color (such as white or in the background color of the substrate 160), so that they can be individually optically recognized and detected, at least when using appropriate magnification.

Figure 7:
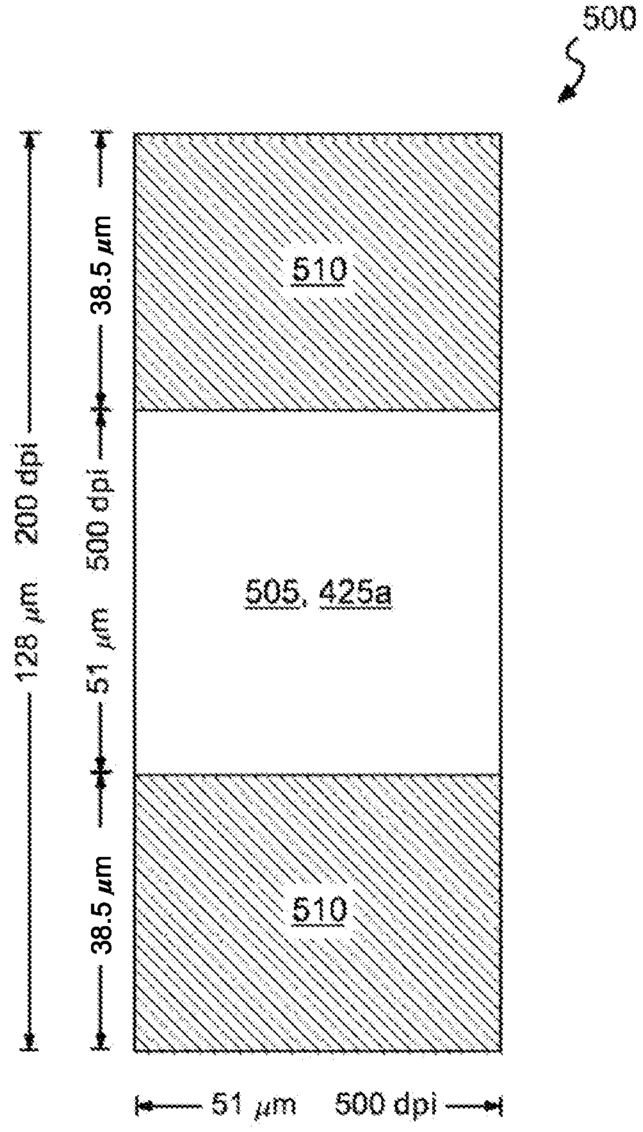
FIG. 7 shows a schematic representation to illustrate a resolution adjustment or pixel shape change as part of the method from FIG. 2.

FIG. 7 illustrates a resolution adjustment or pixel shape modification as part of the method 200. As previously described in detail with reference to FIG. 3, an image grid of the source image 305 and of the intermediate image 400 was used here as an example, in which the rows and columns have a different resolution and therefore different edge lengths of the pixels in the two orthogonal directions (x and y, respectively). In order to be able to put into effect the aforementioned gaps between adjacent wave packets in the target image 455 and, if applicable, the subsequently generated reproduced image 465, without thereby having to accept undesirable distortion (not to be confused with the desired temporary distortion in step 210 according to the distortion rule) of the respective image, the pixels, when transitioning to the target image 455, are trimmed so that they have a symmetrical, in particular square, shape with respect to width and height, so that the portion or portions that have been cut away are available for the gaps to be formed.

This is shown in FIG. 7, where a pixel 500 of the intermediate image 400 is broken down into a square portion 505 that is to be transferred into the target image, and two remaining portions 510 that are not to be transferred into the target image. Instead of the two remaining portions 510 that are not to be transferred into the target image, a (half) gap to the respective neighboring pixel is formed in the target image 455.

In addition, exemplary dimensions and resolutions (in dpi) are given in FIG. 7, whereby these exemplary dimensions and resolutions refer specifically to the source image 305 or equally to the intermediate image 400.

Figure 8:
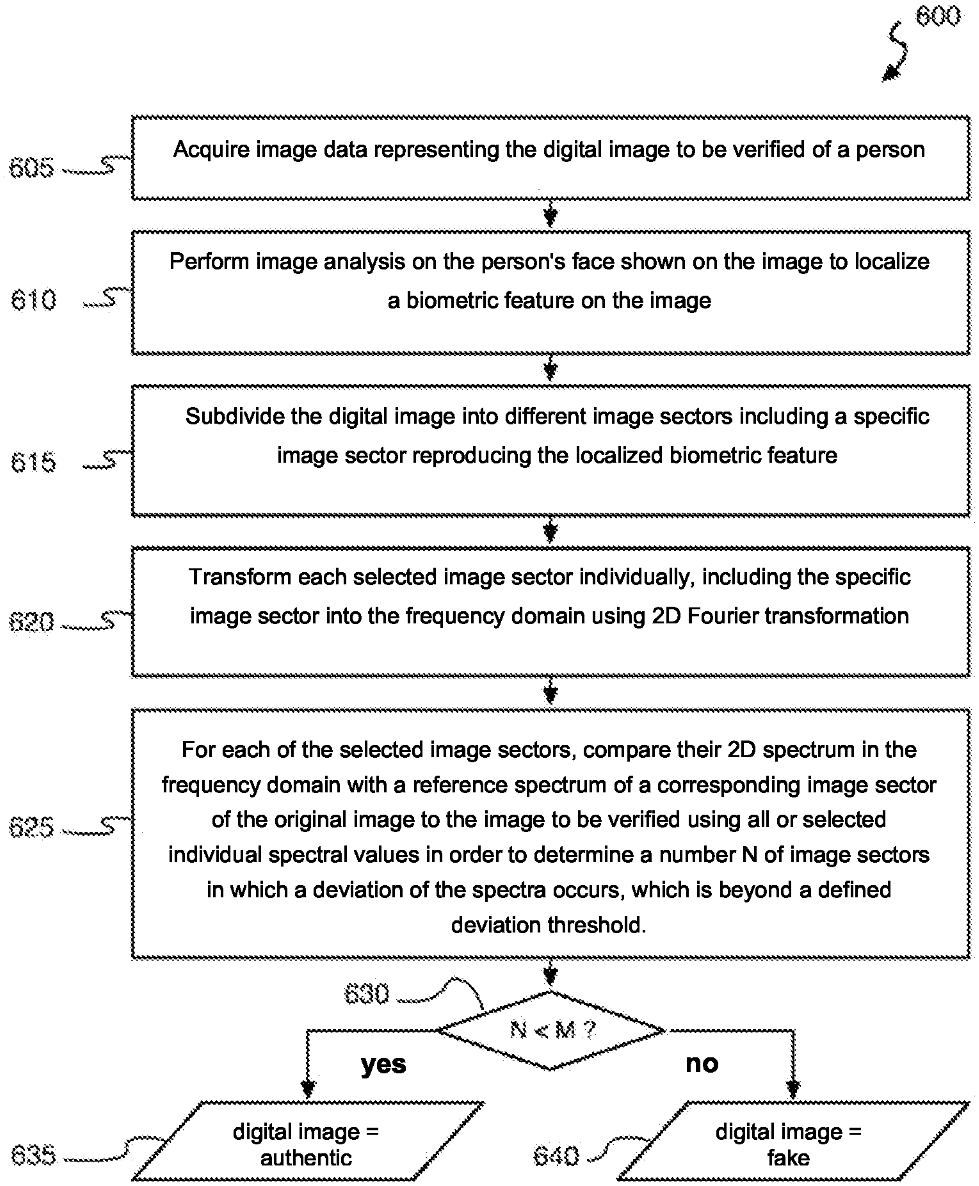
FIG. 8 is a flowchart illustrating an exemplary embodiment of a verification method for verifying digital images, in particular digital images that can be generated by the image conversion method according to the security solution (such as according to FIG. 2).
Figure 9:
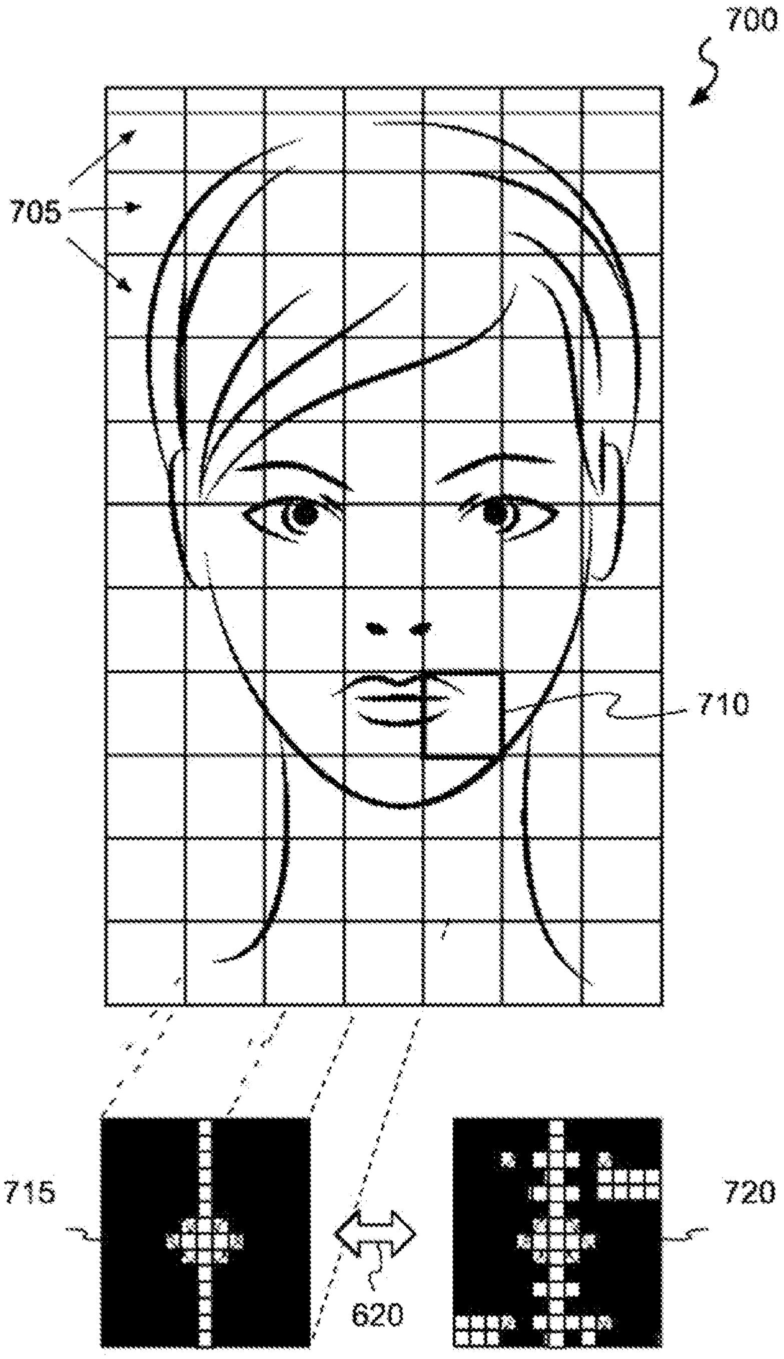
FIG. 9 shows a schematic representation to illustrate a verification of a digital image based on its two-dimensional (2D) Fourier spectrum as part of the method from FIG. 8.

FIG. 8 illustrates, with the aid of a flowchart, an exemplary embodiment 600 of a verification method, in particular a computer-implemented verification method, for verifying digital images, in particular digital images that can be generated by the image conversion method according to the security solution (such as according to FIG. 2). FIG. 9 shows a schematic representation to illustrate a verification of a digital image based on its two-dimensional (2D) Fourier spectrum as part of the method 600 from FIG. 8.

In the verification method 600, in a step 605, image data are acquired that represents a digital image 700 to be verified. In the following, it is assumed by way of example that this digital image 700 represents a person P (see FIG. 9). Similar to the case of the system 100 from FIG. 1, the acquiring of the image 700 can take place in particular using a camera, by receiving image data via a communication connection or by reading out from a memory. The image 700 can in particular be present as a physical image on an object surface, in particular on a sheet-shaped substrate 160, in particular on a document page of a document (such as a passport document).

In a further (optional) step 610 of the verification method 600, an image analysis takes place, in which the digital image 700 is analyzed, in particular for particularly relevant image components. This can in particular include image segmentation. In the case of a person P represented at least in portions by the image 700, the image analysis can in particular include a facial analysis in which biometric features of the face, such as the position of the eyes, in particular the pupils, the nose, ears, corners of the mouth, etc. are localized. This can in particular have the purpose, in a further step 615 of the method 600, in which the digital image is subdivided into different image sectors 705, to define the image sectors 705 depending on the localized biometric features, for example in such a way that at least one image sector 705 is defined for each biometric feature. In FIG. 9, for example, the image sector 710 represents such a selected image sector from the set of image sectors 705.

The subdivision of the image into several image sectors 705 illustrated in FIG. 9 serves in particular to carry out a transformation from the spatial domain into the frequency domain by a two-dimensional transformation, here, by way of example, specifically a two-dimensional Fourier transformation, in a further step 620 based on individual image sectors (such as image sector 710). In this context, the image sectors taken into account can in particular be all of the defined image sectors 705 or only a specific selection thereof. This selection can be determined in particular by the fact that only image sectors 710 defined for the biometric features, in particular all of them, belong to this selection.

As an example, a matrix-shaped (discrete) 2D Fourier spectrum 715 of the selected image sector 710 resulting from step 620 is shown in FIG. 9, in which each point of the matrix represents, via its point value (which is characterized in FIG. 9 by different colors or hatchings), the value of a specific Fourier coefficient or spectral value of the spectrum 715. The center of the spectrum corresponds to the frequency zero and the position of the respective point in the matrix identifies the respective wave vector or Fourier coefficient associated therewith, so that the distance of a respective point from the center corresponds to the frequency (or wavelength) represented by the point. The direction vector represented by the center and the point characterizes the direction of propagation in the two-dimensional spatial domain represented by the point.

In the present example, it is assumed that the image sector 710—similar to the image portion 470*a* from FIG. 6—comprises a plurality of wave packets. The bright line in the spectrum, which indicates that the Fourier coefficients corresponding to the points of the line in the spectrum 715 are heavily occupied, is essentially due to the very frequent, approximately horizontal regions of the minima and maxima of the wave packets (in the spatial domain) that are due to the wave packets that are present in the image sector 710 several times.

As part of a further step 625 of the method 600, several comparisons are now made, in which a spectrum 715 obtained from a selected image sector in step 620 is compared with a respective reference spectrum 720, which results from the authentic original image for the relevant image sector when the same transformation is applied. The reference spectra 720 can in particular be stored in advance in a memory in a manner secured against unauthorized access in order to be read from them and made available for the purpose of comparison. It is possible, for example, to design this so that the reference spectra 720 can be retrieved from a remote server via a secure communication connection.

In the example of FIG. 9, a comparison of the spectrum 715 derived from the image 700 to be verified with the corresponding reference spectrum 720 derived from the authentic original image shows a significant deviation. A corresponding comparison is now carried out individually for all selected image sectors. In order to finally determine whether the image 700 is the original image or a fake, in particular a test criterion can be used that is based on a number N of the selected image sectors of the image 700, in which, as part of their respective assigned spectrum comparison, a deviation beyond a defined deviation threshold has been detected. This number N can now be compared with a predetermined threshold M, with which the sensitivity of the test method can be adjusted. If the result of this is that N is smaller than M (630—yes), then the digital image 700 is classified as authentic and this result is output in a step 635. Otherwise, (630—no) the image 700 is classified as fake and this result is output in a step 640. In particular, M=1 can be chosen, so that a deviation in the spectrum 715 of a single image sector is sufficient to classify the image 700 as inauthentic or fake.

The comparison of the two spectra 715 and 720 for the respective image sector can be carried out in particular on a Fourier coefficient basis, i.e. in such a way that the Fourier coefficients of the two spectra 715 and 720, which Fourier coefficients correspond to one another in a one-to-one relationship, are respectively compared with one another, whereby a check is carried out as to whether their values differ from one another by more than a permitted threshold. The total number of values lying beyond the threshold can then be compared with an acceptance threshold in order to determine whether there is a (significant) deviation between the two spectra in the respective image sector.

While at least one exemplary embodiment has been described above, it is to be noted that a large number of variations thereto exist. It is also to be noted that the exemplary embodiments described only represent non-limiting examples, and that it is not intended to thereby restrict the scope, the applicability, or the configuration of the devices and methods described herein. Rather, the preceding description will provide the person skilled in the art with guidance for implementing at least one exemplary embodiment, wherein it is to be understood that various modifications in the operation and arrangement of the elements described in an exemplary embodiment may be made without thereby departing from the scope of the subject matter respectively defined in the appended claims, as well as its legal equivalents.

What is claimed is:

1. An image conversion method for integration of a security feature into a digital source image to generate a target image secured by the integrated security feature, wherein the image conversion method comprises:

acquiring source image data which represent a digital source image to be protected by the security feature, which digital source image comprises pixels arranged in a grid of straight parallel rows of pixels, each having at least one pixel value per pixel;

generating intermediate image data, which represent an intermediate image that results from the source image by applying a distortion rule, according to which, for each row of pixels of the source image, the respective pixel values of pixels of the row of pixels are transferred within the grid along a direction which is angled to the row of pixels, to a respective other pixel of the grid which, in relation to the respective pixel, is determined or determinable by the distortion rule in such a way that an arrangement of these other pixels in the grid has a transverse waveform;

generating target image data representing the target image, wherein;

the intermediate image is scanned in rows of pixels to define for each row of pixels of the intermediate image a sequence of pixels that follow each other according to the scanning, the pixel values of which have resulted from the transfer of corresponding pixel values from the source image in accordance with the distortion rule;

each pixel of the sequence is transformed into a respective corresponding pixel of the target image by determining its position in the target image based on its position in the intermediate image by compensating for distortion suffered by applying the distortion rule when generating the intermediate image, so that the arrangement of the respective pixels of each sequence in the target image represents a transverse-wave-shaped wave packet; and the integrated security feature is defined by the wave packets, wherein the arrangement of the respective pixels of each sequence in the target image is determined such that each of two adjacent wave packets are separated from each other by a gap, and wherein a substrate is selected or processed in such a way that it has a color that contrasts with an average of the colors of the pixels that form the wave packets of the target image, which are determined according to the pixel values, in such a way that neighboring wave packets can be visually distinguished.

2. The image conversion method of claim 1, further comprising:

generating a physical reproduced image of the target image on a surface of the substrate, wherein the reproduced image of the target image is generated by serially generating pixels on the substrate, to generate a series of pixels on the substrate, which corresponds to a respective sequence of pixels of the target image, and generating these pixels of the series on the substrate in accordance with a pixel order defined by the sequence of the corresponding pixels of the target image.

3. The image conversion method of claim 2, wherein the physical reproduced image of the target image is generated on the substrate using laser inscription, in which the pixels of the reproduced image are sequentially generated on the substrate using a laser beam.

4. The image conversion method of claim 3, wherein the different positions of the series at which the laser beam strikes the substrate to generate the pixels of the reproduced image are controlled by variable deflection of the laser beam in a mirror-based laser galvanometer.

5. The image conversion method of claim 4, wherein at least one mirror of the laser galvanometer is controlled using a control signal for controlling a respective position of a pixel of the reproduced image to be generated on the substrate, which control signal is defined as a function of a compensation that has been determined for that pixel of the intermediate image which corresponds to the pixel of the reproduced image to be generated.

6. The image conversion method of claim 4, wherein a laser galvanometer is used for variable deflection of the laser beam, in which the inertia of at least one of its mirrors used for deflection is so large that, when imaging the wave packets of the target image by generating the pixels of the reproduced image on the substrate, deviations between the reproduced image and the target image arise in the event of abrupt changes in direction along the course of the wave packets.

7. The image conversion method of claim 1, wherein the arrangement of the respective pixels of each sequence in the target image is determined so that it represents a transverse-wave-shaped wave packet which is periodic at least in some portions, and wherein the arrangement of the respective pixels of each sequence in the target image is determined so that it represents a transverse-wave-shaped wave packet which is sinusoidal at least in some portions.

8. The image conversion method of claim 1, wherein each of the wave packets resulting in a respective sequence has at least two inflection points.

9. The image conversion method of claim 1, wherein the grid of pixels of the source image has rows and columns, and the resolution of the rows is different from the resolution of the columns.

10. The image conversion method of claim 9, wherein the resolution of the source image in the direction orthogonal to the rows of pixels is at most 70% of the resolution in the direction running along the rows of pixels.

11. The image conversion method of claim 9, wherein the resolution of the source image in the direction orthogonal to the rows of pixels is at least 200 pixels per inch or per 2.54 cm, PPI.

12. The image conversion method of claim 1, wherein the pixels of the target image are determined in such a way that their respective extents are the same along and orthogonal to the transverse direction of the wave packets.

13. The image conversion method of claim 1, wherein the distortion rule is defined such that when it is applied to rows of pixels of the source image, at least for a subset of the rows of pixels, the wave packet respectively resulting from this has a first waveform in one or more portions of its course and a second waveform different from the first waveform in at least another portion of its course.

14. An image conversion device which is configured to carry out the image conversion method of claim 1.

15. A computer program or computer program product, comprising instructions which cause an image conversion device to carry out the image conversion method of claim 1.

16. A digital image with an integrated security feature, which has been generated by the image conversion method of claim 1 as a target image or reproduced image of the same on the substrate.

17. The digital image with an integrated security feature of claim 16, having a plurality of mutually parallel rows of pixels, each of which has a transverse-wave-shaped course, wherein adjacent rows of pixels are separated from one another by a gap which, as regards its color, contrasts at least in some portions with respect to the rows of pixels separated thereby, wherein the security feature is defined by the wave-shaped course of the rows of pixels and of the gaps between them.

18. The digital image with integrated security feature of claim 17, wherein the digital image is formed on a document page serving as a substrate for a value document or a security document.

19. The image conversion method of claim 1, wherein in the step of generating intermediate image data: the direction which is angled to the row of pixels along which the respective pixel values are transferred is perpendicular to the row of pixels.

20. The image conversion method of claim 1, wherein the substrate is selected or processed such that the color of the substrate is also visually differentiated from the colors of the pixels that form the wave packets of the target image.

* * * * *